(12) United States Patent
Hartman et al.

(10) Patent No.: US 12,145,315 B2
(45) Date of Patent: *Nov. 19, 2024

(54) THREE-DIMENSIONAL PRINTING

(71) Applicant: HEWLETT-PACKARD DEVELOPMENT COMPANY, L.P., Spring, TX (US)

(72) Inventors: Aja Hartman, Palo Alto, CA (US); John Samuel Dilip Jangam, Palo Alto, CA (US); Wei Huang, Palo Alto, CA (US); Thomas Craig Anthony, Palo Alto, CA (US); Gary J Dispoto, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/779,729

(22) PCT Filed: Dec. 11, 2019

(86) PCT No.: PCT/US2019/065676
§ 371 (c)(1),
(2) Date: May 25, 2022

(87) PCT Pub. No.: WO2021/118555
PCT Pub. Date: Jun. 17, 2021

(65) Prior Publication Data
US 2023/0020639 A1 Jan. 19, 2023

(51) Int. Cl.
*B29C 64/264* (2017.01)
*B29C 64/153* (2017.01)
(Continued)

(52) U.S. Cl.
CPC .......... *B29C 64/264* (2017.08); *B29C 64/153* (2017.08); *B29C 64/255* (2017.08);
(Continued)

(58) Field of Classification Search
CPC ... B29C 64/264; B29C 64/153; B29C 64/255; B33Y 10/00; B33Y 30/00; B33Y 70/00
See application file for complete search history.

(56) References Cited

U.S. PATENT DOCUMENTS 8,597,420 B2 12/2013 Iftime et al.
8,801,954 B2 8/2014 Iftime et al.
(Continued)

FOREIGN PATENT DOCUMENTS

CN 106571101 A 4/2017
WO 2017/189306 A1 11/2017

OTHER PUBLICATIONS

Berger, M., "3D-printing ink highly loaded with iron oxide nanoparticles," Nanowerk, retrieved at https://www.nanowerk.com/nanotechnology_articles/newsid=49649.php, retrieved on May 11, 2019, 2 pages.

*Primary Examiner* — Nahida Sultana
(74) *Attorney, Agent, or Firm* — HP Inc. Patent Department

(57) ABSTRACT

The present disclosure relates to a three-dimensional printing kit comprising: a powder bed material comprising polymer particles; a fusing agent comprising a radiation absorber and a liquid carrier; and a magnetic marking agent comprising magnetic nanoparticles, a humectant and a liquid carrier, wherein the concentration of magnetic nanoparticles is 5 to 70 weight % based on the total weight of the magnetic agent. The present disclosure also relates to a method of three-dimensional (3D) printing a 3D printed object. The method comprises: selectively applying a magnetic marking agent onto powder bed material, wherein the powder bed material
(Continued)

comprises polymer particles, and wherein the magnetic marking agent comprises magnetic nanoparticles and a liquid carrier; selectively fusing the powder bed material, such that the magnetic nanoparticles are incorporated in the 3D printed object in a predetermined arrangement that forms a detectable marker in the 3D printed object.

15 Claims, 7 Drawing Sheets

(51) Int. Cl.
   *B29C 64/255* (2017.01)
   *B33Y 10/00* (2015.01)
   *B33Y 30/00* (2015.01)
   *B33Y 70/10* (2020.01)

(52) U.S. Cl.
   CPC .............. *B33Y 10/00* (2014.12); *B33Y 30/00* (2014.12); *B33Y 70/10* (2020.01); *B29K 2995/0008* (2013.01)

(56) References Cited

U.S. PATENT DOCUMENTS

| | | | |
|---|---|---|---|
| 9,114,567 B2* | 8/2015 | Monsheimer | B22F 10/28 |
| 11,712,845 B2* | 8/2023 | DeKam | H01F 41/0253 |
| | | | 106/285 |
| 2006/0142419 A1 | 6/2006 | Xu et al. | |
| 2014/0275317 A1 | 9/2014 | Moussa | |
| 2018/0169900 A1* | 6/2018 | Haq | C08K 3/22 |
| 2018/0236724 A1 | 8/2018 | Compton et al. | |
| 2019/0348202 A1* | 11/2019 | Sachdev | B29C 64/371 |

\* cited by examiner

THREE-DIMENSIONAL PRINTING

BACKGROUND

Three-dimensional (3D) printing is an additive printing process used to make three-dimensional solid objects from a digital model. 3D printing techniques may be considered additive processes because they can involve the application of successive layers of material.

DETAILED DESCRIPTION

Figure 1:
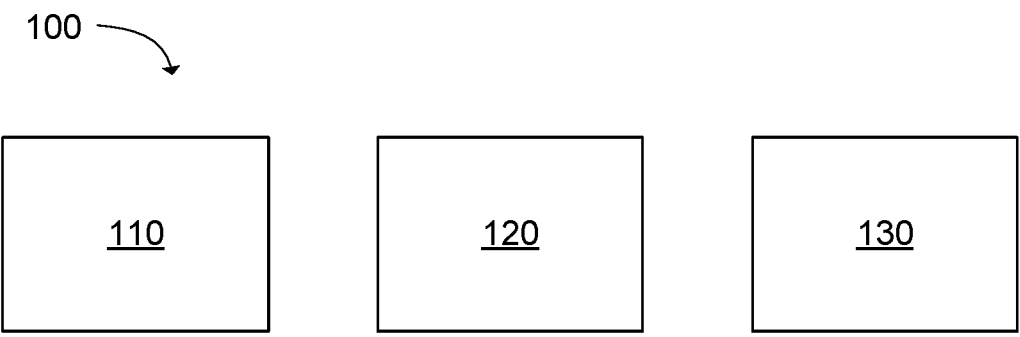
FIG. 1 is a schematic illustrating an example three-dimensional printing kit in accordance with the present disclosure.

The present disclosure describes a method of three-dimensional (3D) printing a 3D printed object. The method comprises: selectively applying a magnetic marking agent onto powder bed material, wherein the powder bed material comprises polymer particles, and wherein the magnetic marking agent comprises magnetic nanoparticles and a liquid carrier; and selectively fusing the powder bed material, such that the magnetic nanoparticles are incorporated in the 3D printed object in a predetermined arrangement that forms a detectable marker in the 3D printed object.

In some examples, a fusing agent comprising a radiation absorber is applied onto the powder bed material; and the powder bed material is exposed to radiation to fuse the powder bed material in contact with radiation absorber to form a layer of the 3D printed object; such that the magnetic nanoparticles are incorporated in the 3D printed object in a predetermined arrangement that forms a detectable marker in the 3D printed object.

The magnetic marking agent may be selectively applied (e.g. by jetting) onto the build material based on a 3D object model of a detectable marker. Similarly, the fusing agent may be selectively jetted onto at least a portion of the build material based on a model of the 3D object to be printed.

In some circumstances, it may be useful for manufacturers to be able to track and trace metal 3D printed objects that are produced. For example, 3D printed parts may be assigned a unique identification number that designates information regarding e.g. the identity, origin or other characterising information on the part. This unique identification number may be imprinted and/or embedded into the parts produced.

In the 3D printing method of the present disclosure, a magnetic marking agent is selectively applied onto the powder bed material (also referred to as "build material"). The powder bed material is selectively fused to form a layer of the 3D printed object, such that the magnetic nanoparticles of the magnetic marking agent are incorporated in the 3D printed object in a predetermined arrangement that forms a detectable marker in the 3D printed object.

In some examples, a fusing agent comprising a radiation absorber may also be selectively applied onto the powder bed material. The powder bed material may be exposed to radiation to fuse the powder bed material in contact with radiation absorber to form a layer of the 3D printed object, such that the magnetic nanoparticles of the magnetic marking agent are incorporated in the 3D printed object in a predetermined arrangement that forms a detectable marker in the 3D printed object.

By incorporating the marking agent into a 3D printed object during the course of printing, magnetic nanoparticles can be incorporated within the 3D printed object and/or on at least a part of an outer surface of the 3D printed object. In one example, the magnetic particles form a detectable marker that encodes data. The marker may enable the part to be identified, located and/or tracked. The marker may encode instructions for processing or manufacturing steps that are to be performed on the 3D printed object. The marker may also guide apparatus employed in, for example, product assembly or transit. For instance, the marker may guide movement of e.g. a robotic arm for gripping or moving the 3D printed object. The marker may encode data in machine-readable form.

The marker may be located at at least one designated location in the 3D printed object. In this example, the 3D printed object may be analyzed at the designated location for the presence of the marker.

In one example, the magnetic marking agent may be incorporated in the 3D printed object in a predetermined arrangement that forms a marker that is not detectable by visual inspection of the 3D printed object. For example, the marker itself may have the same appearance (e.g. colour) as an outer surface(s) of the 3D printed object. For example, the marker itself may be invisible. Alternatively or additionally, the marker may not be located on an outside surface of the 3D printed object. In one example, the magnetic nanoparticles may be incorporated in an inner portion of the 3D printed object.

The detectable marker may have characteristic magnetic properties. It may be possible to detect magnetic flux B or magnetic field H produced by magnetized magnetic particles. Field or flux detection may be performed in air, and since $B=\mu H$ and permeability $\mu$ of air is one, B and H may be approximately the same. There are many ways to detect magnetic flux, B, including Hall sensors, magneto resistive sensors, inductive sensors, and magnetic force sensors. In some examples, it may be possible to incorporate such sensors into a microelectromechanical system (MEMS) device.

In some examples, the magnetic nanoparticles may comprise a ferromagnetic material.

The magnetic nanoparticles may comprise at least one of iron, cobalt and nickel. In some examples, the magnetic nanoparticles may comprise an iron oxide.

In some examples, the polymer particles may comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, wax, or a combination thereof.

In some examples, where a fusing agent is employed, the fusing agent may be applied a) onto the powder bed material at the same or adjacent locations to which magnetic marking agent is also selectively applied, and b) onto the powder bed material at locations where no magnetic marking agent is applied.

In some examples, where a fusing agent is employed, the fusing agent may be applied onto the powder bed material at locations where no magnetic marking agent is applied. In some examples, the fusing agent may be applied onto the powder bed material at locations where no magnetic marking agent is applied but not to locations where the magnetic marking agent is applied. In this example, the magnetic marking agent may also act as a fusing agent. For example, the magnetic marking agent may include a radiation absorber that may the same or distinct from the magnetic nanoparticles.

The present disclosure also relates to a three-dimensional printing kit comprising: a powder bed material comprising polymer particles; a fusing agent comprising a radiation absorber and a liquid carrier; and a magnetic marking agent comprising magnetic nanoparticles, and a liquid carrier. The concentration of magnetic nanoparticles is 5 to 70 weight % based on the total weight of the magnetic marking agent.

In some examples, the radiation absorber may be carbon black, a near-infrared absorbing dye, a near-infrared absorbing pigment, a conjugated polymer, a tungsten bronze, a molybdenum bronze, metal nanoparticles, or a combination thereof.

In some examples, the polymer particles may comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, wax, or a combination thereof.

In some examples, the humectant may be 1,2-butanediol.

In some examples, the magnetic nanoparticles may comprise iron (III) oxide nanoparticles.

Three-Dimensional Printing Kits

As mentioned above, the three-dimensional printing kit of the present disclosure includes a powder bed material, a fusing agent, and a magnetic marking agent. The powder bed material includes polymer particles. The fusing agent can be a radiation absorber, for example, a non-magnetic radiation absorber. The radiation absorber may absorb radiation energy and convert the radiation energy to heat. The magnetic marking agent includes magnetic nanoparticles. In certain examples, the magnetic nanoparticles can include iron(III) oxide nanoparticles. In certain examples, the fusing agent includes a liquid carrier, for instance, water.

In one example, the three-dimensional printing kit comprises: a powder bed material comprising polymer particles; a fusing agent comprising water and a non-magnetic radiation absorber to absorb radiation energy and convert the radiation energy to heat; and a magnetic marking agent comprising iron(III) oxide nanoparticles having an average particle size from about 1 nm to about 50 nm.

As used herein, "magnetic nanoparticles" can refer to nanoparticles of ferromagnetic or ferrimagnetic materials. In general, magnetic nanoparticles are superparamagnetic when dispersed in the magnetic marking fluid due to their small size (1-100 nm diameter). At these dimensions, the magnetic anisotropy energy of the particles, which is proportional to particle size, is insufficient to prevent randomization of magnetization direction due to thermal fluctuations. As a result, the magnetization of superparamagnetic particles is zero in the absence of an applied magnetic field. However, these materials have a strong susceptibility to magnetization. Magnetic materials can become magnetized when a magnetic field is applied to the materials, and the strength of magnetization can depend on the strength of the magnetic field. In some such materials, magnetization can persist for a time period after removal of the magnetic field. Magnetic materials may not be permanent magnets, but rather can include "soft" magnetic materials like FeSi, NiFe, or MnZn ferrite, which can be magnetized by a magnetic field from a permanent magnet or an electromagnet. Magnetic materials as described herein can be attracted to permanent magnets, but may not exert any magnetic attractive force on their own.

In another example the magnetic nanoparticles can include "hard" magnetic materials like AlNiCo, strontium ferrite, barium ferrite, or samarium cobalt. When dispersed as magnetic nanoparticles in the magnetic marking fluid, these materials may also be superparamagnetic. After the magnetic marking fluid is jetted into the powder bed, nanoparticles coalesce into aggregates upon evaporation of solvents. Aggregates of superparamagnetic particles have a larger effective magnetic volume and hence, larger magnetic anisotropy. As a result, they can lose their superparamagnetic behavior and assume the magnetic character of the magnetic nanoparticle material in bulk form. If hard magnet materials such as AlNiCo, strontium ferrite, barium ferrite, or samarium cobalt are used as magnetic marking agent, permanent magnet structures can be printed as magnetic volumes in the part. These magnetic structures will retain their magnetization after application of a magnetic field.

FIG. 1 is a schematic of one example three-dimensional printing kit 100. This three-dimensional printing kit includes a powder bed material 110 that includes polymer particles, a fusing agent 120, and a magnetic marking agent 130. The fusing agent can include water and a non-magnetic radiation absorber to absorb radiation energy and convert the radiation energy to heat. The magnetic marking agent can include a magnetic nanoparticle dispersion. In a specific example, the magnetic nanoparticle dispersion can include iron(III) oxide nanoparticles having an average particle size from about 1 nm to about 50 nm.

Figure 2:
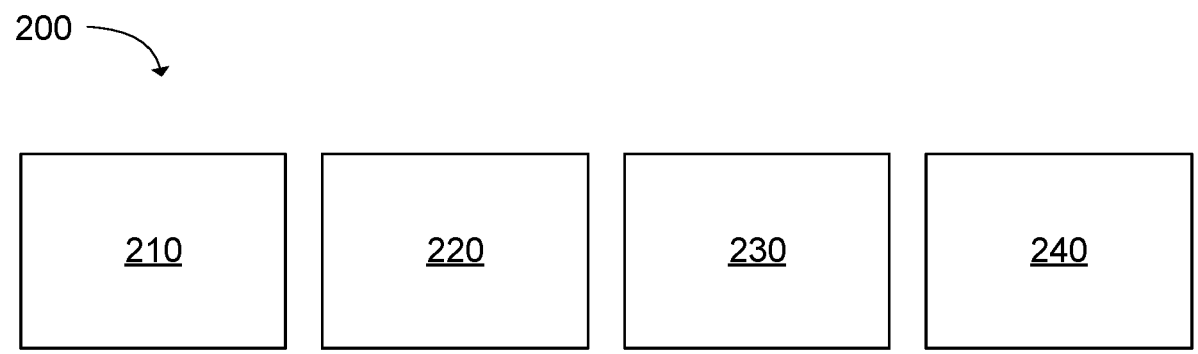
FIG. 2 is another schematic illustrating another example three-dimensional printing kit in accordance with the present disclosure.

Another example is shown in FIG. 2. This figure shows an example three-dimensional printing kit 200 that includes a powder bed material 210, a fusing agent 220, a magnetic agent 230, and a detailing agent 240. The fusing agent, magnetic agent, and the detailing agent can be selectively applied to the powder bed material. The powder bed material, fusing agent, and magnetic agent can include the same ingredients as in the examples above. The detailing agent can include a detailing compound. Generally, the detailing compound can be a compound that can reduce the temperature of powder bed material onto which the detailing agent is applied. For example, the detailing compound can be a solvent that evaporates at a temperature below the temperature of the powder bed material, so that the powder bed material is evaporatively cooled by the detailing compound.

In some examples, the detailing agent can be applied in any areas where cooling of the powder bed material is desired. In certain examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

Figure 3A:
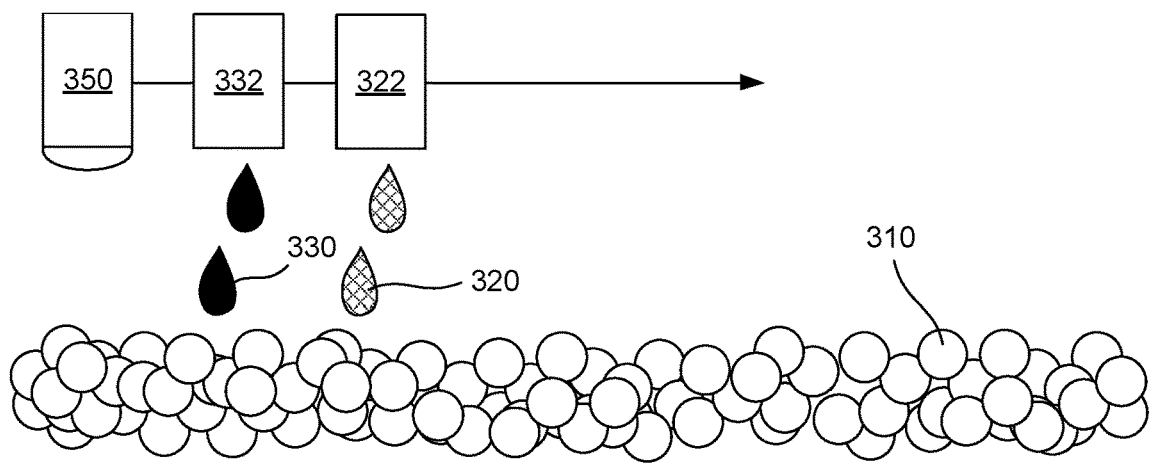
FIGS. 3A-3C show a schematic view of an example three-dimensional printing process using an example three-dimensional printing kit in accordance with the present disclosure.
Figure 3B:
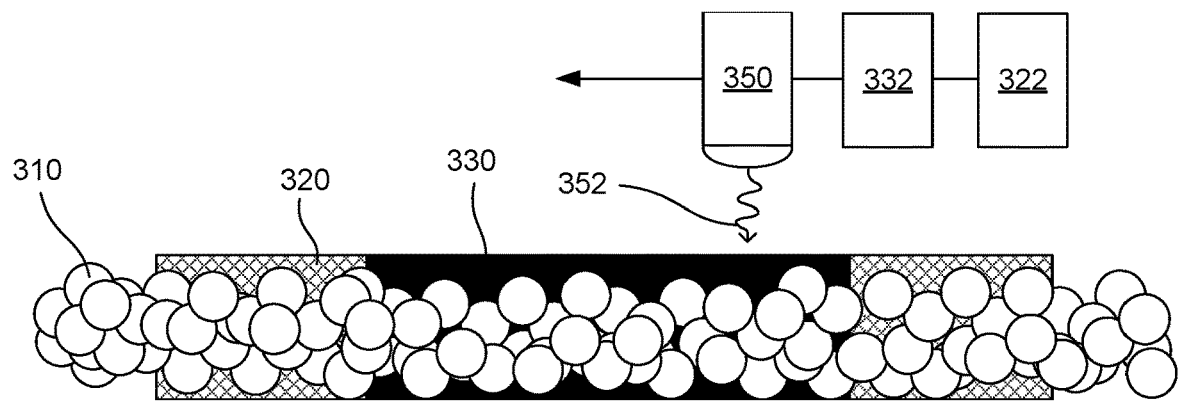
Figure 3C:
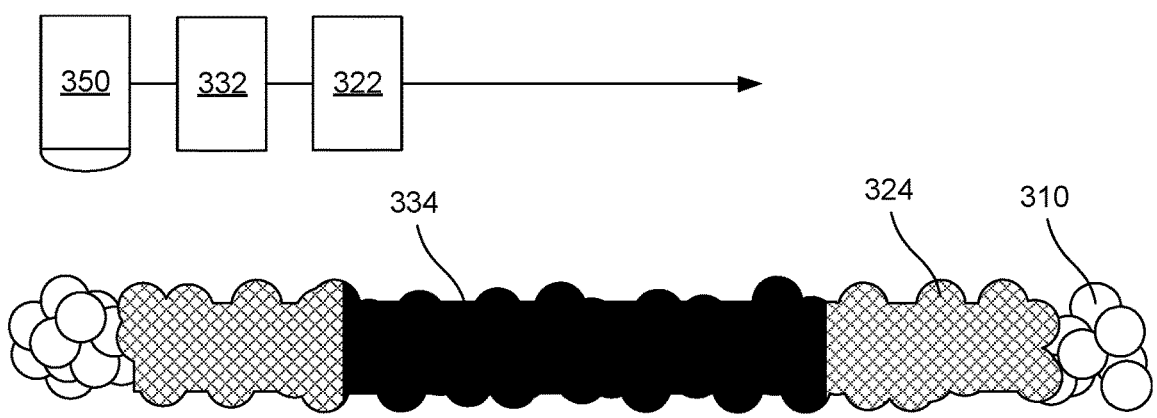

FIGS. 3A-3C illustrate one example of using the three-dimensional printing kits to form a 3D printed object. In FIG. 3A, a fusing agent 320 and a magnetic marking agent 330 are jetted onto a layer of powder bed material 310 made up of polymer particles. The fusing agent is jetted from a fusing agent ejector 322 and the magnetic marking agent is jetted from a magnetic marking agent ejector 332. These fluid ejectors can move across the layer of powder bed material to selectively jet fusing agent on areas that are to be fused. The magnetic marking agent can be jetted on areas to form a magnetic volume in the 3D printed object. In some examples, the magnetic agent can be selectively printed in certain areas to form magnetic volumes that are a portion of the 3D printed object. The magnetic volume may form a detectable marker in the 3D printed object. The detectable marker may take the form of a distinctive pattern within the part. The detectable marker may be detected when the 3D printed object is subjected to a magnetic field. The detectable marker may allow the 3D printed object to be identified or tracked. The marker may encode instructions for processing or manufacturing steps that are to be performed on the 3D printed object. The marker may also guide apparatus employed in, for example, product assembly or transit. For instance, the marker may guide movement of e.g. a robotic arm for gripping or moving the 3D printed object. The marker may encode data in machine-readable or human-readable form.

Information encoded in patterned magnetic markers can be detected by a magnetic sensor. Soft magnetic patterns can be detected by inductive readers similar to those used to read MICR characters on checks. Magnetic flux through an inductive coil is sensitive to the magnetic environment beneath the inductive coil. Translation of the coil relative to the printed magnetic pattern results in a voltage waveform representative of the encoded information. Magnetic force detection is another method that can be used to sense soft magnetic patterns. In this case, a small permanent magnet or electromagnet is translated across the surface of the printed part. Presence of soft magnetic material creates an attractive force between the part and sensor that can be detected by standard force sensing methods. Information can be encoded in both the location and magnitude of magnetic material in the part. Force sensing is insensitive to scan speed, unlike inductive sensing.

Patterned permanent magnet markers can be detected by sensing the magnetic flux emanating from the magnetic volume. Magnetoresistive or inductive sensors similar to those found in magnetic disk drives can be used to sense magnetic flux. Sensors of this type are extremely sensitive and can detect information at high resolution. Magnetic force sensors can also be employed to detect permanent magnet markers.

Total quantity of magnetic material in the part can also be used to encode information. In this case differences among the saturation magnetization of printed parts can be used to provide unique information. Magnetic induction can be used to measure magnetization. For example, passing the parts through an electrical coil will generate a voltage proportional to the amount of magnetization in the part. Soft magnetic material needs to be magnetized in a static field during this measurement. Remanant magnetization in permanent magnet material eliminates that need to magnetize the parts.

The magnetic volume can occupy a significant portion of the 3D printed object (or article), such as from about 1 or about 10% to 100% of the thickness of the 3D printed object. By making the magnetic volume relatively large and/or by using strong magnets, the 3D printed object can be given bulk magnetic properties such as the capability of attracting permanent magnets or becoming strongly magnetized in a magnetic field. Also as shown in FIG. 3A, a radiation source 350 can also move across the layer of powder bed material.

FIG. 3B shows the layer of powder bed material 310 after the fusing agent 320 has been jetted onto an area of the layer that is to be fused. Additionally, the magnetic agent 330 has been jetted onto an area to form a layer of the magnetic volume of the 3D printed article. The magnetic volume may provide a detectable marker positioned at a predetermined location within the 3D printed object. The 3D printed object may be analyzed at or in the vicinity of the predetermined location to detect the detectable marker. In this figure, the radiation source 350 is shown emitting radiation 352 toward the layer of powder bed material. The radiation absorber in the fusing agent can absorb the UV radiation and produce heat to fuse the polymer particles where the fusing agent was jetted.

FIG. 3C shows the layer of powder bed material with a fused portion 324 where the fusing agent was jetted. This portion has reached a sufficient temperature to fuse the polymer particles together to form a solid polymer matrix. The area where the magnetic agent was jetted is also fused together to form a layer of the magnetic volume 334 with the magnetic nanoparticles from the magnetic agent locked within the solid polymer matrix. Thus, the magnetic volume can have bulk magnetic properties due to the magnetic nanoparticles. As discussed above, these bulk magnetic properties can act as a detectable marker.

In some examples, fusing may be achieved in the absence of a fusing agent e.g. using laser(s). By fusing the portions of build material powder in contact with magnetic agent, magnetic agent can be incorporated into the structure as a magnetic volume that can act as a detectable marker.

Powder Bed Material

The powder bed material can include polymer particles having a variety of shapes, such as substantially spherical particles or irregularly-shaped particles. In some examples, the polymer powder can be capable of being formed into 3D printed objects with a resolution of about 20 µm to about 100 µm, about 30 µm to about 90 µm, or about 40 µm to about 80 µm. As used herein, "resolution" refers to the size of the smallest feature that can be formed on a 3D printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

As used in the present disclosure, "average" with respect to properties of particles refers to a volume average unless otherwise specified. Accordingly, "average particle size" refers to a volume average particle size. Additionally, "particle size" refers to the diameter of spherical particles, or to the longest dimension of non-spherical particles. Particle size may be determined by any suitable method, for example, by laser diffraction spectroscopy.

In accordance with some examples, the volume-based particle size distribution of the polymer powder or build material can be as follows: D50 can be from about 45 μm to about 75 μm, from about 55 μm to about 65 μm, or about 60 μm; D10 can be from about 20 μm to about 50 μm, from about 30 μm to about 40 μm, or about 35 μm; and D90 can be from about 75 μm to about 100 μm, from about 80 μm to about 95 μm, or about 90 μm. "D50" is defined as the median particle diameter (by volume). "D10" is defined as the tenth-percentile by volume of powder that is below a given particle size, e.g., from about 20 μm to about 50 μm. "D90" is defined as the ninetieth-percentile by volume of powder that is below a given particle size, e.g., about 75 μm to about 100 μm.

In one example, the particle size distribution of the build material is as follows:
 a. D50 is from about 45 μm to about 70 μm,
 b. D10 is from about 20 μm to about 50 μm, and
 c. D90 is from about 75 μm to about 100 μm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. In some examples, the polymer can also be non-magnetic. For example, the polymer powder can be polyamide 6 powder, polyamide 9 powder, polyamide 11 powder, polyamide 12 powder, polyamide 6,6 powder, polyamide 612, thermoplastic polyamide, polyamide copolymer powder, thermoplastic polyamide, polyamide copolymer, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C.

The powder bed material can also in some cases include a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1. In further examples, if the powder bed material includes a filler then the filler can be non-magnetic so that the powder bed material as a whole is non-magnetic.

Fusing Agents

The multi-fluid kits and three-dimensional printing kits described herein can include a fusing agent to be applied to the powder bed build material. The fusing agent can include a radiation absorber that can absorb radiant energy and convert the energy to heat. In some examples, the radiation absorber can be non-magnetic. In certain examples, the fusing agent can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In certain examples, the fusing agent can be colorless. This can allow for printing colored articles using the in-situ formed pigments described herein. Colorless fusing agents can include a radiation absorber that does not absorb wavelengths in the visible spectrum, or that weakly absorbs wavelengths in the visible spectrum. In some cases, the colorless fusing agent can actually have a faint color, but the faint color can be easily overpowered by the colored in-situ formed pigments so that the faint color of the fusing agent is not noticeable.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, dials, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Magnetic Agents

The magnetic marking agent can include a dispersion of magnetic nanoparticles. In some examples, the dispersion can be an aqueous dispersion and the magnetic agent can include water. The magnetic agent may also include a humectant.

The magnetic nanoparticles in the magnetic agent can be any ferromagnetic, ferrimagnetic, or superparamagnetic material, which includes materials that have a high magnetic susceptibility.

In some examples, the magnetic nanoparticles can include at least one of iron, cobalt and nickel. The iron, cobalt and/or nickel may be present in metallic form. Surface passivation may be present on the metallic magnetic nanoparticles to prevent oxidation. Alternatively, the iron, cobalt and/or nickel may be preset in the form of metal compound(s), e.g. oxides.

In some examples, the magnetic nanoparticles can include iron(II) oxide, iron(III) oxide, iron(II,III) oxide (magnetite), complex metal oxides of ferrite type, nickel, cobalt, or an alloy thereof. Alloys of these materials can be combinations of two or more of the listed materials or alloys with other metals or elements that are not listed. In a particular example, the magnetic nanoparticles can include iron(III) oxide nanoparticles having an average particle size from about 1 nm to about 100 nm, for example, about 10 nm to about 70 nm, for instance, about 20 nm to about 50 or about 60 nm.

Particle size may be determined by any suitable method, for example, by laser diffraction spectroscopy, transmission electron microscopy, or by dynamic light scattering.

In some example, ferrites may be employed as the magnetic nanoparticles. Suitable ferrites include strontium ferrite, barium ferrite, manganese ferrite, zinc ferrite, cobalt ferrite and nickel ferrite and combinations of the above (manganese zinc ferrite, for example). In other examples, magnetic alloys may be used. For example, an alloy comprising aluminium, nickel and cobalt (AlNiCo) may be employed. Other example alloys include alloys of samarium and cobalt (SmCo). Other examples include neodymium magnets, for example, NdFeB. In one example, magnetic iron oxide nanoparticles are employed. In one example, a cobalt-modified magnetic iron oxide is employed. Some alloys may require surface-passivation prior to being formulated in the magnetic marking agent.

In some examples, the magnetic nanoparticles may have an average particle size of size from about 1 nm to about 100 nm, for example, about 10 nm to about 70 nm, for instance, about 20 nm to about 50 or about 60 nm.

In certain examples, the magnetic nanoparticles can have an average particle size that is smaller than the average particle size of the powder bed material. Thus, when the magnetic agent is jetted onto the powder bed, the magnetic particles can penetrate between the powder particles.

The ratio of the average particle size of the magnetic nanoparticles to the average particle size of the powder bed material may be more than about 1:500, for example, more than about 1:1000.

The concentration of the magnetic nanoparticles in the magnetic agent can be sufficient to form a concentration of the magnetic nanoparticles in the powder bed that can impart bulk magnetic properties to the powder bed material when the magnetic agent is jetted onto the powder bed. In certain examples, the concentration of magnetic nanoparticles in the magnetic agent can be from about 5 wt % to about 70 wt %, for example, about 10 to about 60 wt % or about 50 wt %. In some examples, the concentration may be about 20 wt % to about 60 wt %. In further examples, the concentration can be from about 10 wt % to about 40 wt % or from about 20 wt % to about 35 wt %.

In some examples, the magnetic marking agent is applied to a plurality of sequential layers of powder bed material. Accordingly, in some examples, after the the powder bed material is fused to form a layer of the 3D printed object; (i) fresh powder bed material may be applied to the fused layer. (ii) A magnetic marking agent may then be selectively applied onto fresh the powder bed material. (iii) The treated powder bed material may then be fused, such that magnetic nanoparticles are incorporated into the newly fused layer. This sequence of steps (i), (ii), and (iii) may be repeated one or more times.

In some examples, the regions of powder bed material treated with magnetic marking agent at least partially overlap to form a magnetic volume that can act as the detectable marker.

In certain examples, the magnetic marking agent can be a MICR ink. In some cases, the magnetic marking agent can include a colorant such as a black colorant. However, in some examples the magnetic marking agent can be colorless. Therefore, the magnetic agent may not include a colorant in some examples. Additionally, in some cases the magnetic nanoparticles can naturally impart a color to the magnetic agent.

In further examples, the magnetic marking agent can include a binder, such as a water soluble polymer or a polymer emulsion. However, in some examples the magnetic marking agent can be printed on polymer powder that is to be fused. Therefore, the magnetic nanoparticles from the magnetic marking agent can be held in place in the fused polymer without any binder in the magnetic agent. Thus, in some examples the magnetic agent may not include a binder.

In further examples, the magnetic marking agent can include a liquid vehicle, dispersant, surfactant, and other components for increasing the jettability of the fluid as described with respect to the fusing agent herein.

The magnetic marking agent may include a humectant. Suitable humectants include diethylene glycol butyl ether, polyethylene glycol, 2-pyrrolidone, N-methyl 2-pyrrolidone, hydroxyethyl 2-pyrrolidone, 1,2-butanediol and combinations thereof. The humectant may be present in an amount of about 20 to about 60 weight %, about 30 to about 50 weight % or about 35 to about 45 weight %.

An example of a formulation for the magnetic marking agent is shown below:

| Ingredient Type | Specific Ingredient | Concentration (wt %) |
| --- | --- | --- |
| Magnetic material | magnetic iron oxide with cobalt doping | 20-60 |
| Humectant | 2-pyrrolidone | 5-30 |
| Liquid Carrier | Ink carrier containing water, humectant, surfactant, biocide and anti-kogation agent, Triethylene glycol | 25 |
| Solvent | Water | 30 |

Detailing Agents

In further examples, three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

The detailing marking agent may include a humectant. Suitable humectants include diethylene glycol butyl ether, polyethylene glycol, 2-pyrrolidone, N-methyl 2-pyrrolidone, hydroxyethyl 2-pyrrolidone, 1,2-butanediol and combinations thereof. The humectant may be present in an amount of about 20 to about 60 weight %, about 30 to about 50 weight % or about 35 to about 45 weight %.

Methods of Making 3D Printed Objects

Figure 4:
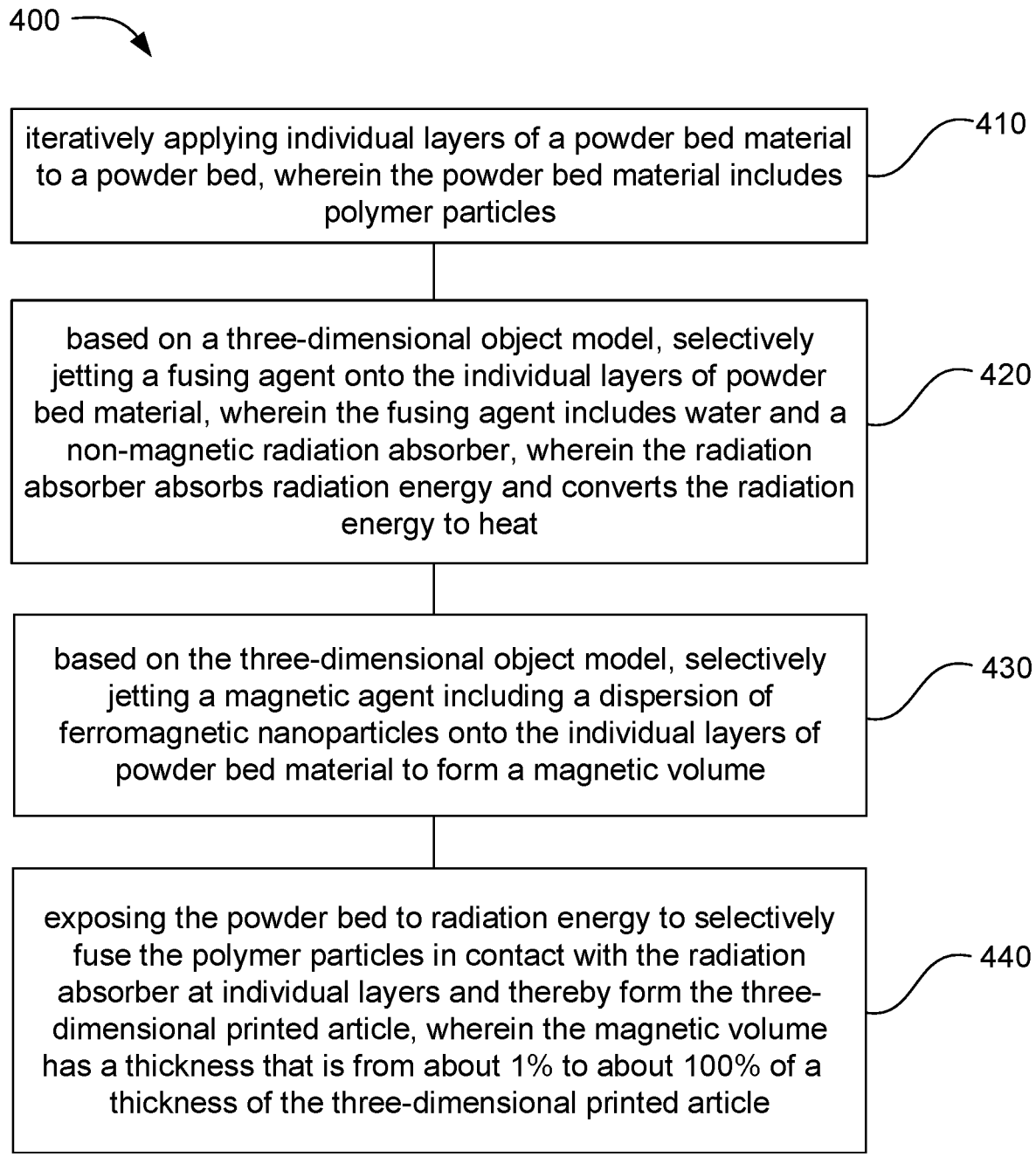
FIG. 4 is a flowchart illustrating an example method of three-dimensional printing in accordance with the present disclosure.

The 3D printed articles described herein can be formed from a polymer powder build material using a process that involves jetting the fusing agent onto layers of the polymer powder and then fusing the powder using electromagnetic energy. A magnetic making agent that includes magnetic nanoparticles can be selectively jetted in areas in a predetermined arrangement that forms a detectable marker within the 3D printed object. The marker may take the form of magnetic volume. FIG. 4 is a flowchart of one example method 400 of making a 3D printed article. The method includes: iteratively applying individual layers of a powder bed material to a powder bed, wherein the powder bed material includes polymer particles 410; based on a three-dimensional object model, selectively jetting a fusing agent onto the individual layers of powder bed material, wherein the fusing agent includes water and a non-magnetic radiation absorber, wherein the radiation absorber absorbs radiation energy and converts the radiation energy to heat 420; based on the three-dimensional object model, selectively jetting a magnetic agent including a dispersion of magnetic nanoparticles onto the individual layers of powder bed material to form a magnetic volume 430; and exposing the powder bed to radiation energy to selectively fuse the polymer particles in contact with the radiation absorber at individual layers and thereby form the three-dimensional printed article, wherein the magnetic volume has a thickness that is from about 10% to about 100% of a thickness of the three-dimensional printed article 440.

The final 3D printed article can have bulk magnetic properties such as the ability to be attracted to permanent magnets, that ability to produce a magnetic field in response to an external magnetic field, the ability to be detected by magnetic proximity detectors, and so on. In some examples, the magnetic volume can be used in place of magnetic metal parts in applications that normally use metal parts, such as the piston of a solenoid, cores of an electric transformer, and so on. Accordingly, the 3D printing methods described herein can be used to make custom shaped and geometrically complex magnetic parts that can be used in a variety of applications.

In some examples, the magnetic volume can make up a relatively large portion of the overall 3D printed article. The magnetic volume can have a thickness that is from about 10% to about 100% of a thickness of the 3D printed article. As used herein, "thickness" can refer to one of the shorter dimensions of the 3D printed article. For example, the longest dimension of the 3D printed article can be the "length" of the article, and the other two dimensions can be referred to as "thickness" and "width," respectively. Therefore, in some examples, the magnetic volume can extend across 10% to 100% of the thickness dimension of the article. In certain examples, the magnetic volume can extend across from 10% to 100% of the thickness dimension and from 10% to 100% of the width dimension. In further examples, the magnetic volume can have a volume from about 0.1% to about 100% of the total volume of the 3D printed article, or from about 1 or 5% to about 100% of the total volume of the 3D printed article. In further examples, the magnetic volume can have a volume from about 0.1% to about 80% of the total volume of the 3D printed article, or from about 1 or 5% to about 60% of the total volume of the 3D printed article. In further examples, the magnetic volume can have a volume from about 10 to about 50% of the total volume of the 3D printed article, or from about 20 to about 40% of the total volume of the 3D printed article.

One application for 3D printed articles having a magnetic volume as described herein can involve making articles that experience a mechanical force in response to an external magnetic field. For example, a 3D printed article with a magnetic volume can be placed near a permanent magnet and experience an attractive force toward the permanent magnet. In some examples, the attractive force can be sufficient to overcome the weight of the 3D printed article so that the 3D printed article can be lifted by the permanent magnet and come into direct contact with the permanent magnet. Another example is a 3D printed piston for a solenoid that includes magnetic nanoparticles from a magnetic agent as described herein. A solenoid can include a coil of wire that can produce a magnetic field when an electric current passes through the coil. The magnetic field can produce an attractive force on the 3D printed piston to draw the piston into the coil. In certain examples, the magnetic volume of the 3D printed article can provide a sufficient field strength when acted upon by an external magnetic field to produce a force from 0.01 N to 1,000 N. In some examples, force can be measured using a scale or other force sensor.

In further examples, the magnetic volume can have a sufficient size and concentration of magnetic nanoparticles to give the magnetic volume a high magnetic susceptibility. In certain examples, the 3D printed article can have a volume magnetic susceptibility (unitless) from about 100 to about 200,000 with respect to the total volume of the 3D printed article. In other examples, the magnetic volume itself can have a volume magnetic susceptibility from about 100 to about 200,000 with respect to the volume of the magnetic volume. In further examples, the mass-based magnetic susceptibility of the magnetic volume can be from about 1 emu/g to about 80 emu/g. In some examples, the magnetic susceptibility can be measured by measuring the force change on the 3D printed article when a magnetic field gradient is applied. This can be measured using an Evans balance. In a specific example, the magnetic susceptibility can be measured using a Magnetic Susceptibility Balance MK 1 from Sherwood Scientific, Ltd. (United Kingdom).

The shape of the 3D printed article and the shape of the magnetic volume can be defined by a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the magnetic volume to be formed in the article. In other examples, the article can be defined by a first 3D object model and the magnetic volume can be defined by a second 3D object model. Other information may also be included, such as structures to be formed of additional different materials or color data for printing the article with various colors at different locations on the article. The 3D object model may also include information or instructions specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, magnetic response strength, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles. The magnetic volume can be formed by applying a magnetic agent to specific portions of individual powder layers. The magnetic agent can include magnetic nanoparticles. When the individual powder layers are fused, the magnetic nanoparticles can form a composite with the fused polymer.

In some examples, a detailing agent can be used together with the fusing agent. The detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. In some cases, the detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas.

Figure 5:
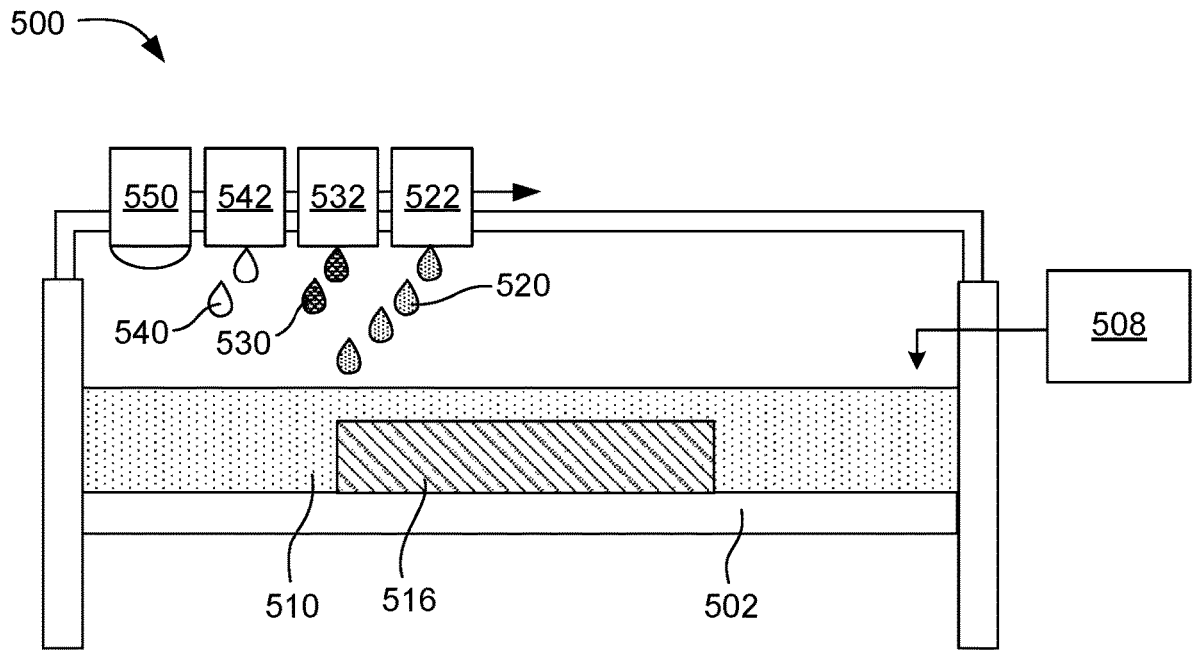
FIG. 5 is a schematic view of an example system for three-dimensional printing in accordance with the present disclosure.

One example illustrating a method of making a 3D printed article according to the present technology is shown in FIGS. 5-9. FIG. 5 shows a 3D printing system 500 that includes a build platform 502 supporting a powder bed of build material powder 510. A partially printed article 516 is made up of fused build material powder in the powder bed. This figure shows a cross-sectional view of the partially printed article and the powder bed. A layer of fresh build material powder is supplied from a build material supply 508 over the top of the partially printed article. Fluids are applied to the layer of fresh build material, including fusing agent 520 from a fusing agent jet 522, magnetic agent 530 from a magnetic agent jet 532, and detailing agent 540 from a detailing agent jet 542. The fluid jets are moveable within the printing system so that the fluid jets can move across the powder bed to apply the fluids in specific, desired locations. The system also includes an electromagnetic energy source 550.

Figure 6:
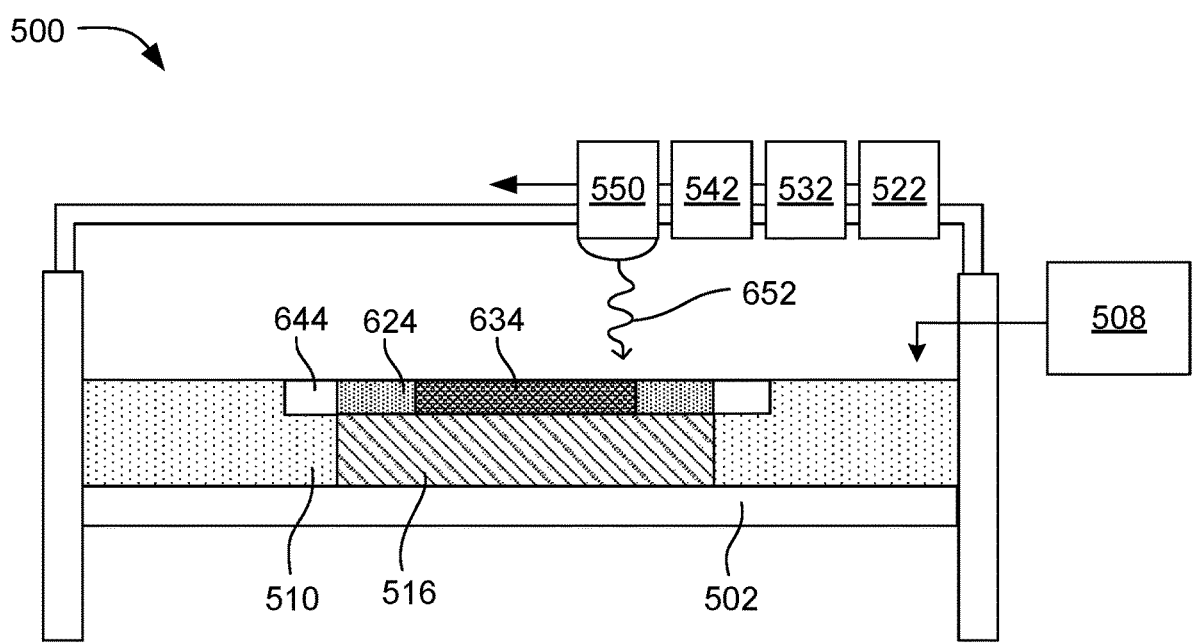
FIG. 6 is another schematic view of the example system for three-dimensional printing in accordance with the present disclosure.

FIG. 6 shows the 3D printing system 500 after the fluids have been jetted onto portions of the fresh build material powder 510. The top layer of build material now includes areas jetted with detailing agent 644, areas jetted with fusing agent 624, and areas jetted with magnetic agent 634. In some cases, the fusing agent can be jetted in all areas where the polymer powder is to be fused to form a solid material. In these cases, both the fusing agent and the magnetic agent can be jetted in areas that are to form a magnetic volume. In other cases, the magnetic agent may act as a radiation absorber so that the magnetic agent can be printed alone and the magnetic agent itself can facilitate fusing of the polymer powder in those areas. The powder bed can be exposed to electromagnetic energy 652 from an energy source 550, such as an infrared lamp.

Figure 7:
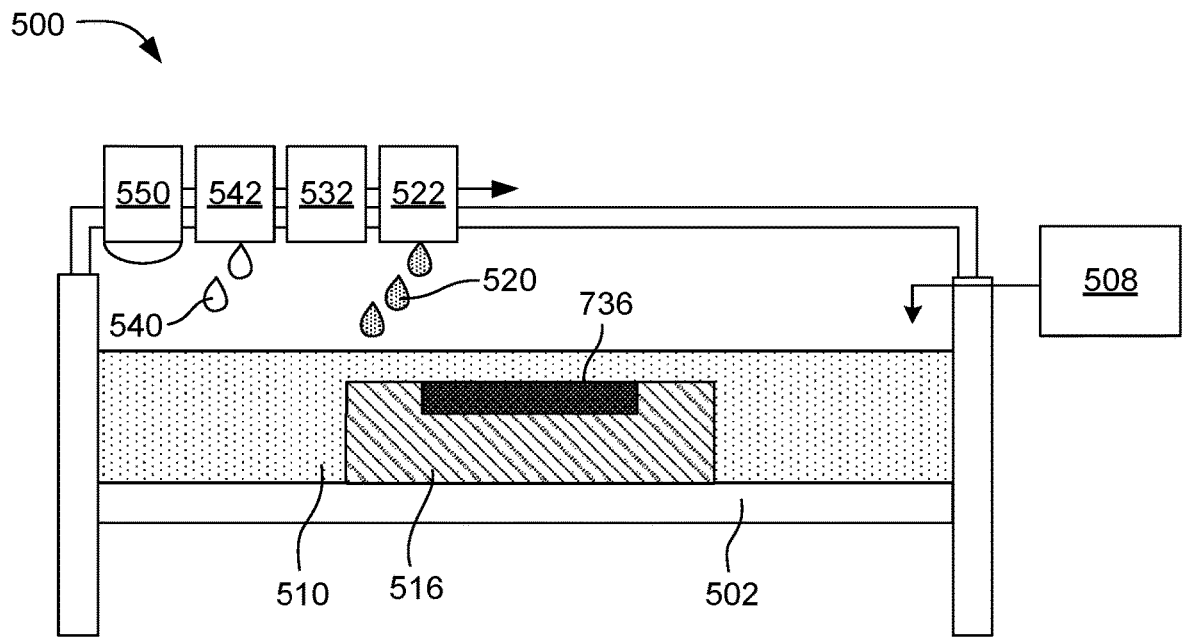
FIG. 7 is another schematic view of the example system for three-dimensional printing in accordance with the present disclosure.

FIG. 7 shows the 3D printing system 500 after fusing the top layer to form an additional layer of the partially printed article 516 now having a magnetic volume 736 as a part of the top layer. A new layer of fresh build material powder 510 is supplied by the build material supply 508. The fusing agent 520 and detailing agent 540 are again jetted from the fusing agent jet 522 and detailing agent jet 542, respectively. However, no magnetic agent is jetted onto this particular layer.

Figure 8:
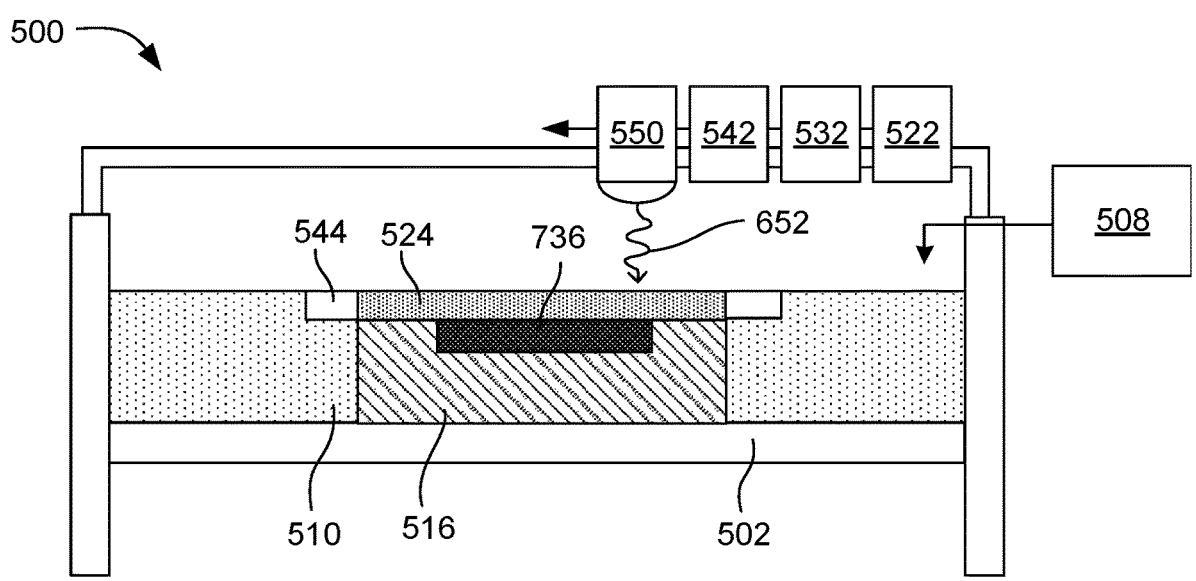
FIG. 8 is another schematic view of the example system for three-dimensional printing in accordance with the present disclosure.

FIG. 8 shows the 3D printing system 500 after jetting the fluids to form an area jetted with fusing agent 524 and an area jetted with detailing agent 544. The powder bed material 510 is again exposed to electromagnetic energy 652 to fuse the area jetted with fusing agent.

Figure 9:
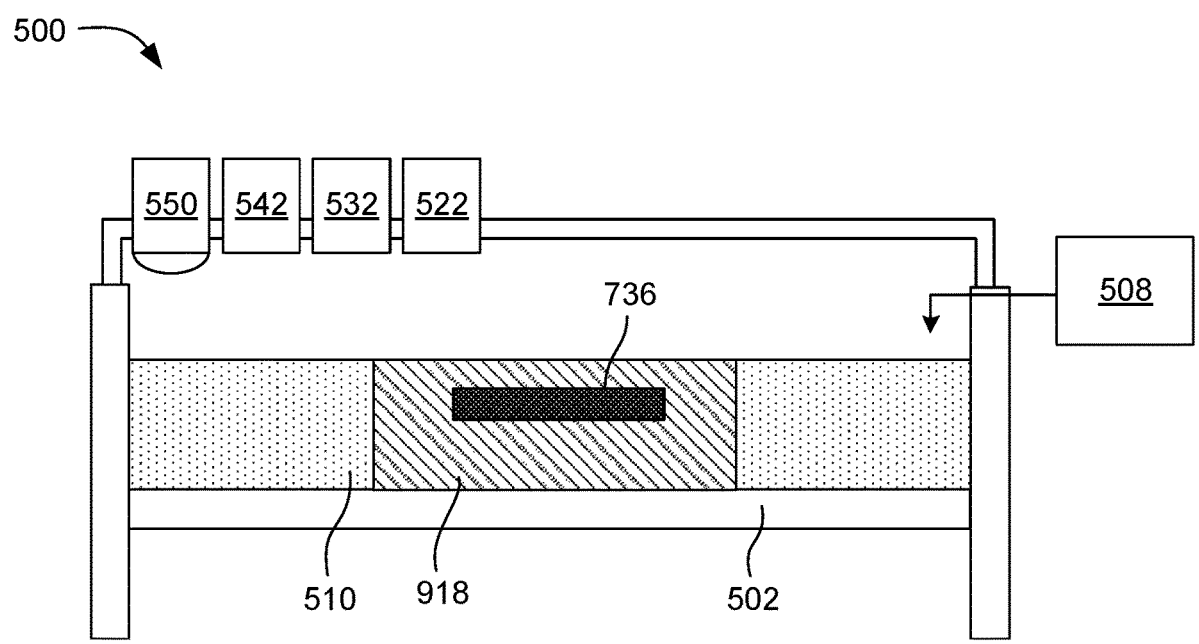
FIG. 9 is another schematic view of the example system for three-dimensional printing in accordance with the present disclosure.

FIG. 9 shows the 3D printing system 500 after fusing the final layer of the partially printed article to form a final printed article 918. The final printed article includes the magnetic volume 736. As explained above, this magnetic volume can give the final printed article bulk magnetic properties such as producing a magnetic field in response to an external magnetic field. Using the systems and methods described herein can allow for the magnetic volume to be located anywhere throughout the 3D printed article, in x, y, and z directions.

In some examples, the individual layers of powder bed material with fusing agent printed thereon can be fused by irradiating the powder bed. This irradiation can be performed using a fusing lamp in some examples. Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the portions printed with the fusing agent while leaving the unprinted portions of the polymer powder below the fusing temperature.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the polymer particles with the fusing agent printed thereon, while the unprinted polymer particles do not absorb as much light and remain at a lower temperature.

In some examples, the 3D printing system can also include preheaters for preheating the polymer powder to a temperature near the fusing temperature. In one example, the system can include a print bed heater to heat the print bed during printing. The preheat temperature used can depend on the type of polymer used. In some examples, the print bed heater can heat the print bed to a temperature from about 50° C. to about 250° C. The system can also include a supply bed, where polymer particles can be stored before being spread in a layer onto the print bed. The supply bed can have a supply bed heater. In some examples, the supply bed heater can heat the supply bed to a temperature from about 80° C. to about 140° C.

Depending on the amount of radiation absorber present in the polymer powder, the absorbance of the radiation absorber, the preheat temperature, and the fusing temperature of the polymer, an appropriate amount of irradiation can be supplied from the electromagnetic energy source or fusing lamp. In some examples, the fusing lamp can irradiate each layer from about 0.1 to about 10 seconds per pass. In further examples, the fusing lamp can move across the powder bed at a rate of about 1 inch per second to about 60 inches per second to fuse each layer. In still further examples, the fusing lamp can move across the powder bed at a rate of about 5 inches per second to about 20 inches per second.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if each numerical value and sub-range is explicitly recited. For example, a weight ratio range of about 1 wt % to about 20 wt % should be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

In the present disclosure, it is noted that when discussing the methods and kits described herein, each of these discussions can be considered applicable to each of these examples, whether or not they are explicitly discussed in the context of that example. Thus, for example, in discussing details about the methods of making 3D printed articles, such discussion also refers to the 3D printing kits and systems, and vice versa.

In the present disclosure, the terms "3D printed object" and "3D printed article" can be used interchangeably.

In the present disclosure, a 3D object model may comprise at least one of: a 3D object model created using Computer Aided Design (CAD) or similar software; or a file, for example, a Standard Tessellation Language file generated based on output of the CAD software, providing one or more processors of a 3D printer with instructions to form the 3D object.

As used in the present disclosure, the terms "magnetic agent" and "magnetic marking agent" can be used interchangeably.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

Two small articles were printed from a polyamide 12 powder using an HP Multi Jet Fusion 3D® printer (HP Inc., California). The 3D printed articles were then dip-coated with a magnetic ink that included a dispersion of magnetic nanoparticles with an average particle size of 50 nm. The magnetic ink was a MICR ink produced by HP, Inc. In addition to magnetic nanoparticles, the magnetic ink included water, organic co-solvent, surfactant, and antikogation agent.

After dip coating the 3D printed articles, a permanent neodymium magnet was placed next to the 3D printed articles. The magnet was able to lift the 3D printed articles such that the part overcomes gravitational forces to come into direct contact with the magnet. Although the magnetic ink was not incorporated into the 3D printed articles during the 3D printed process, this example shows that 3D printed articles can be given magnetic properties by post-processing with a magnetic agent.

Example 2

Several small 3D printed articles were formed using the HP Multi Jet Fusion 3D® printer with a fusing agent and a magnetic agent. The MICR agent used in Example 1 was loaded into a fluid ejector slot of the 3D printer. A fusing agent was loaded into another slot of the 3D printer. After printing these 3D printed articles, the neodymium magnet was placed next to the articles and the magnet was able to lift the entire mass of the articles using magnetic force. This example shows that the magnetic agent can withstand the high temperature environment of the 3D printing process and that the 3D printed articles made with the magnetic agent can have bulk magnetic properties.

Example 3

Two 3D object models were prepared for articles having a "dogbone" shape. The models included magnetic volumes at the ends of the dogbones with a non-magnetic region in the center of the dogbone. The magnetic regions occupied the entire thickness and width of each end of the dogbones. The 3D articles were printed using the same 3D printer, fusing agent, and magnetic agent as used in Example 2. After printing, the articles were removed from the powder bed and sandblasted to remove any excess loose powder. The neodymium magnet was then placed next to the magnetic volumes at the ends of the 3D printed articles. The magnetic volumes were found to have an attractive force toward the magnet such that the magnetic volumes overcome gravitational forces to come into direct contact with the magnet. The neodymium magnet was then placed near the center region of the 3D printed articles, and no attractive force was observed. This shows that the magnetic properties can be localized to the magnetic volumes where the magnetic agent is applied during 3D printing.

Example 4

In this Example, the following example was used.

TABLE 1

Example of Fusing Agent.

| Ingredient Type | Specific Ingredient | Concentration (wt %) |
| --- | --- | --- |
| Fusing Material | Carbon Black | 5 |
| Humectant | 2-pyrrolidone | 45 |
| Liquid Carrier | Ink carrier containing water, humectant, surfactant, biocide and anti-kogation agent, Triethylene glycol | 25 |
| Solvent | Water | 30 |

The fusing agent and a commercially available MICR ink were used to print a 3D printed dog bone using a PA-12 powder bed material. The MICR ink was applied in a predetermined arrangement at the end portions of the dog bone. The MICR ink was printed at a contone level of 128. The print bed was kept at 145° C. during the print. The ends of the dog bone were found to be capable of lifting 1 g of magnets as a result of the magnetic field provided by the ferromagnetic nanoparticles embedded in the dog bone structure.

Example 5

Figure 10:
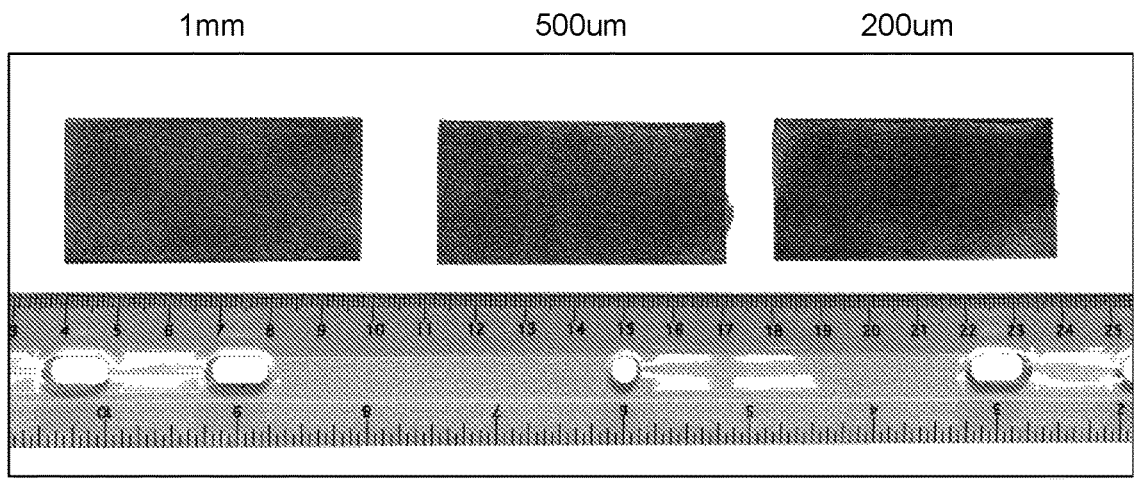
FIG. 10 is a photograph of cleaned and sandblasted 3D printed parts including text printed with MICR ink at different magnetic volume thicknesses, after the 3D printed parts were cleaned and sandblasted (noting the printed text is invisible)
Figure 11:
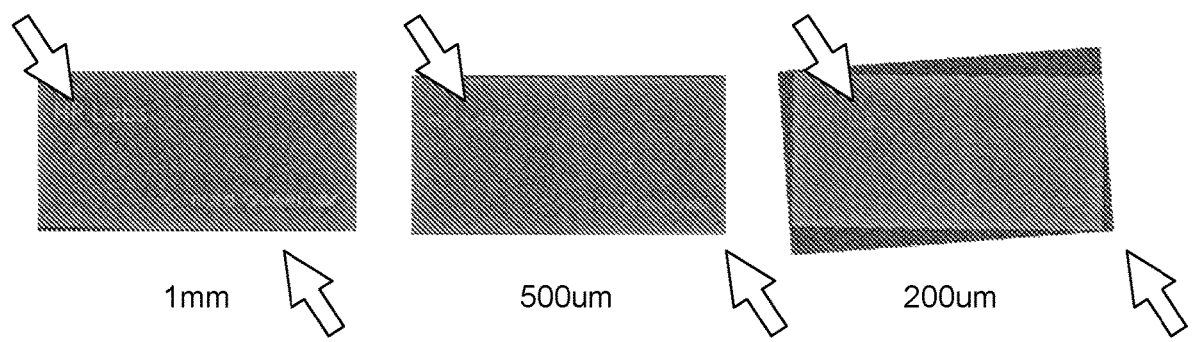
FIG. 11 is a radiograph of the 3D printed parts of FIG. 10, where the printed text is visible.

In this example, the fusing agent and MICR ink described in Example 4 above were used to print a 3D printed tile using PA-12 powder bed material. The tiles had outer dimensions of 58 mm×29 mm×2 mm. The MICR ink was used to print the text "HP Labs" on top left-hand corner and "Dalmata Queen" in the bottom right-hand corner. The text was printed as magnetic volumes with thicknesses of 200 μm, 500 μm and 1 mm in Z-direction. FIG. 10 shows the 3D printed parts after cleaning and sand blasting. Using the nondestructive testing technology of radiography, the embedded text could be distinctly read. This capability can be utilized to uniquely identify the parts. Since X-rays penetrate through the 3D printed parts, this technique can be used for identifying the parts in uncleaned state. As can be seen from FIG. 11, the embedded letters are visible in the radiographs. This is due to the higher atomic weight of the magnetic nanoparticles (FeOx) compared to the rest of the 3D printed part. The contrast increases as the amount of the magnetic nanoparticles (greater thickness) increases.

What has been described and illustrated herein is an example of the disclosure along with some of its variations. The terms, descriptions, and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

Further examples of the present disclosure are described in the following numbered paragraphs:

1. A three-dimensional printing kit comprising: a powder bed material comprising polymer particles; a fusing agent comprising water and a non-magnetic radiation absorber to absorb radiation energy and convert the radiation energy to heat; and a magnetic agent comprising iron(III) oxide nanoparticles having an average particle size from about 1 nm to about 50 nm.

2. The three-dimensional printing kit of paragraph 1, further comprising a detailing agent comprising a detailing compound, wherein the detailing compound reduces the temperature of powder bed material onto which the detailing agent is applied.

3. The three-dimensional printing kit of any preceding paragraph, wherein the radiation absorber is carbon black, a near-infrared absorbing dye, a near-infrared absorbing pigment, a conjugated polymer, a tungsten bronze, a molybdenum bronze, metal nanoparticles, or a combination thereof.

4. The three-dimensional printing kit of any preceding paragraph, wherein the polymer particles comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, wax, or a combination thereof.

5. The three-dimensional printing kit of any preceding paragraph, wherein the powder bed material is non-magnetic.

6. A method of making a magnetic three-dimensional printed article comprising: iteratively applying individual layers of a powder bed material to a powder bed, wherein the powder bed material comprises polymer particles; based on a three-dimensional object model, selectively jetting a fusing agent onto the individual layers of powder bed material, wherein the fusing agent comprises water and a non-magnetic radiation absorber, wherein the radiation absorber absorbs radiation energy and converts the radiation energy to heat; based on the three-dimensional object model, selectively jetting a magnetic agent comprising a dispersion of magnetic nanoparticles onto the individual layers of powder bed material to form a magnetic volume; exposing the powder bed to radiation energy to selectively fuse the polymer particles in contact with the radiation absorber at individual layers and thereby form the three-dimensional printed article, wherein the magnetic volume has a thickness that is from about 10% to about 100% of a thickness of the three-dimensional printed article.

7. The method of paragraph 6, wherein the magnetic volume provides sufficient field strength when acted upon by an external magnetic field to produce a force from 0.01 N to 1,000 N.

8. The method of paragraph 6 or 7, wherein the magnetic volume provides a sufficient field strength when acted upon from above by a permanent magnet to overcome the force of gravity and cause the three-dimensional printed article to come into direct contact with the permanent magnet.

9. The method of any one of paragraphs 6 to 8, wherein the volume magnetic susceptibility of the three-dimensional printed article is from about 100 to about 200,000 with respect to the total volume of the three-dimensional printed article.

10. The method of any one of paragraphs 6 to 9, wherein the magnetic nanoparticles comprise iron(II) oxide, iron(III) oxide, iron(II,III) oxide (magnetite), complex metal oxides of ferrite type, nickel, cobalt, or an alloy thereof.

11. The method of any one of paragraphs 6 to 10, wherein the magnetic nanoparticles are iron(III) oxide nanoparticles having an average particle size from about 1 nm to about 50 nm.

12. The method of any one of paragraphs 6 to 11, wherein the polymer particles comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, wax, or a combination thereof.

13. A system for three-dimensional printing comprising: a powder bed material comprising polymer particles: a fusing agent comprising water and a non-magnetic radiation absorber, wherein the radiation absorber absorbs radiation energy and converts the radiation energy to heat; a fusing agent ejector to eject the fusing agent onto individual layers of the powder bed material based on a three-dimensional object model; a magnetic agent comprising a dispersion of magnetic nanoparticles; a magnetic agent ejector to eject the magnetic agent onto the individual layers of the powder bed material based on the three-dimensional object model to form a magnetic volume, wherein the three-dimensional object model comprises the magnetic volume and the magnetic volume is from about 10% to about 100% of a thickness of the three-dimensional object model; and a radiant energy source positioned to expose the layer of powder bed material to radiation energy to selectively fuse the polymer particles in contact with the radiation absorber and thereby form a three-dimensional printed article.

14. The system of paragraph 13, wherein the magnetic nanoparticles comprise iron(II) oxide, iron(III) oxide, iron (II,III) oxide (magnetite), complex metal oxides of ferrite type, nickel, cobalt, or an alloy thereof.

15. The system of paragraph 13 or 14, wherein the magnetic nanoparticles are iron(III) oxide nanoparticles having an average particle size from about 1 nm to about 50 nm.

The invention claimed is:

1. A three-dimensional printing kit comprising:
    a powder bed material comprising polymer particles;
    a fusing agent comprising a radiation absorber and a liquid carrier; and
    a magnetic marking agent comprising magnetic nanoparticles, a humectant, and a liquid carrier, wherein a concentration of the magnetic nanoparticles in the magnetic marking agent ranges from 5 weight % to 70 weight %, based on a total weight of the magnetic marking agent.

2. The three-dimensional printing kit of claim 1, wherein the radiation absorber is carbon black, a near-infrared absorbing dye, a near-infrared absorbing pigment, a conjugated polymer, a tungsten bronze, a molybdenum bronze, metal nanoparticles, or a combination thereof.

3. The three-dimensional printing kit of claim 1, wherein the polymer particles comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, wax, or a combination thereof.

4. The three-dimensional printing kit of claim 1, wherein the magnetic nanoparticles comprise at least one of iron, cobalt, or nickel.

5. A method of three-dimensional (3D) printing a 3D printed object, the method comprising:
    selectively applying a magnetic marking agent onto powder bed material, wherein the powder bed material comprises polymer particles, and wherein the magnetic marking agent comprises magnetic nanoparticles and a liquid carrier;
    selectively fusing the powder bed material, such that the magnetic nanoparticles are incorporated into the 3D printed object in a predetermined arrangement that forms a detectable marker in the 3D printed object.

6. The method of claim 5, wherein prior to selectively fusing the powder bed material, the method further comprises applying a fusing agent including a radiation absorber onto the powder bed material; and
    the selectively fusing the powder bed material involves exposing the powder bed material to radiation to fuse the powder bed material in contact with radiation absorber to form a layer of the 3D printed object, such that the magnetic nanoparticles are incorporated into the 3D printed object in the predetermined arrangement that forms the detectable marker in the 3D printed object.

7. The method of claim 5, wherein the magnetic nanoparticles comprise at least one of iron, cobalt, or nickel.

8. The method of claim 7, wherein the magnetic nanoparticles comprise an iron oxide.

9. The method of claim 5, wherein the polymer particles comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, wax, or a combination thereof.

10. The method of claim 5, wherein the detectable marker is magnetically detectable and is not detectable by visual inspection of the 3D printed object.

11. The method of claim 5, wherein the magnetic nanoparticles are incorporated into an inner portion of the 3D printed object.

12. The method of claim 5, wherein the detectable marker encodes data that enables the 3D printed object to be identified, located, or tracked.

13. The method of claim 5, wherein the detectable marker is detectable by magnetic sensor.

14. The method of claim 5, wherein after selectively fusing the powder bed material, the method further comprises detecting a magnetic flux or a magnetic field of the detectable marker of the 3D printed object.

15. The method of claim 6, wherein the fusing agent is applied a) onto the powder bed material at a same or at an adjacent location to which magnetic marking agent is also selectively applied, and b) onto the powder bed material at a location where no magnetic marking agent is applied.

* * * * *